Aug. 21, 1962 F. L. MOSELEY ET AL 3,050,669
OPTICAL CURVE FOLLOWING SERVOMOTOR CONTROL SYSTEM
Filed July 29, 1960 3 Sheets-Sheet 1
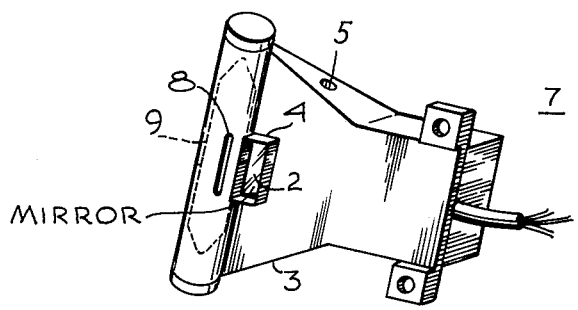
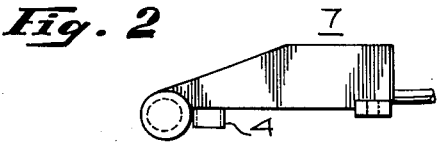
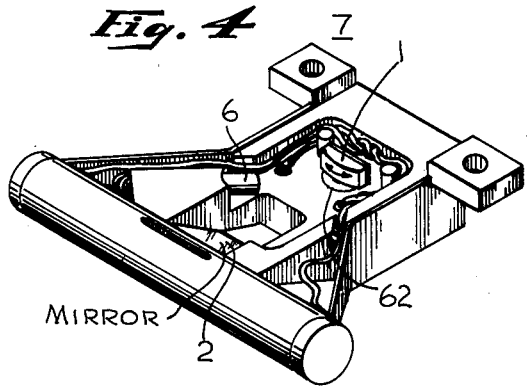
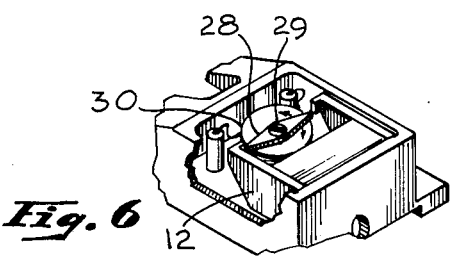
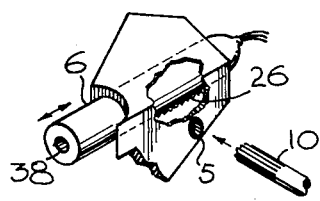
FRANCIS L. MOSELEY
ANDRES O. HOLDO
INVENTORS
BY Frasier and Bogurski
ATTORNEYS Aug. 21, 1962  F. L. MOSELEY ET AL  3,050,669
OPTICAL CURVE FOLLOWING SERVOMOTOR CONTROL SYSTEM
Filed July 29, 1960
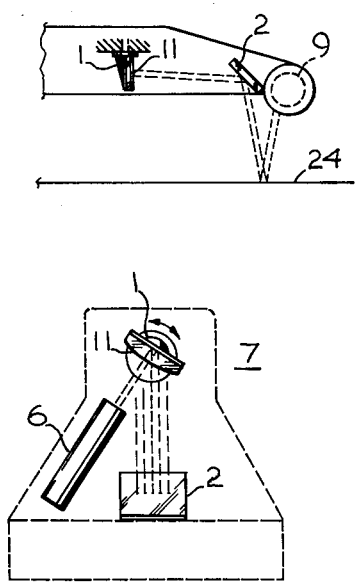
Fig. 7A
Fig. 7B
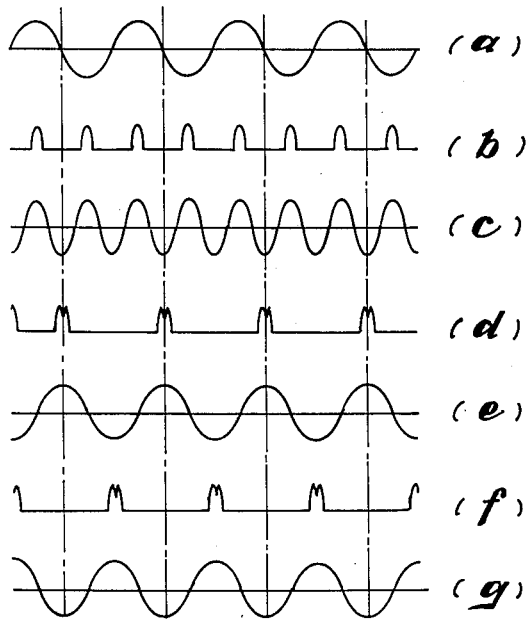
Fig. 8
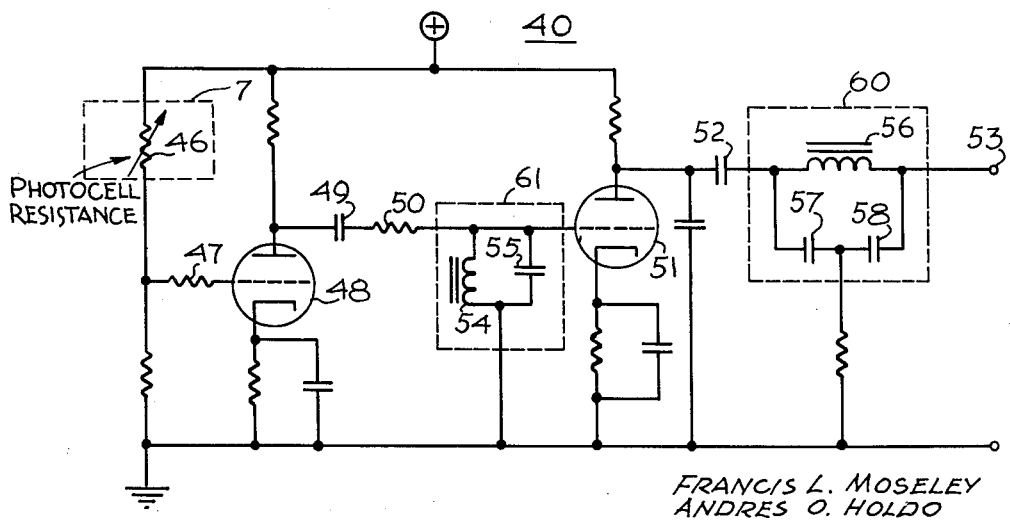
Fig. 9
FRANCIS L. MOSELEY
ANDRES O. HOLDO
INVENTORS
BY ATTORNEYS

FRANCIS L. MOSELEY
ANDRES O. HOLDO
INVENTORS

United States Patent Office 3,050,669
Patented Aug. 21, 1962

3,050,669
OPTICAL CURVE FOLLOWING SERVOMOTOR CONTROL SYSTEM
Francis L. Moseley and Andres O. Holdo, Pasadena, Calif., assignors to F. L. Moseley Co., a corporation of California
Filed July 29, 1960, Ser. No. 46,249
13 Claims. (Cl. 318—31)

This invention relates to line following apparatus and more particularly to apparatus for following a line or curve drawn by a recording device.

Recorders of the type which automatically draw a line or curve representative of some function that is desired to be plotted are well known. Thus, a curve may be produced illustrating the variations in a signal being monitored by the recorder.

For the purposes of performing a nonvisual examination of the curve plotted by such a recorder, an arrangement for performing the inverse of the recording process is desirable. That is, a signal output which is of varying voltage is desired which might be derived from a line or curve drawn by a pen recorder. Furthermore, there are occasions when it is desirable to be able to analyze, by means of a voltage derived from a plotted graph, the variations of a line or curve which might be drawn by hand.

One arrangement for providing an output voltage signal in correspondence with the variations of a curve is disclosed in United States Patent 2,835,858, granted May 20, 1958, to F. L. Moseley. In this arrangement a line following head is employed in conjunction with a curve comprising an alternating current carrying conductor to follow the path of the line or curve as it passes thereunder. This arrangement requires, however, that the line or curve be marked with a conducting material in order to generate magnetic fields which are detected by the curve following head. One disadvantage of this arrangement is that such conducting materials, for example, conducting ink, must generally be applied to a curve by hand with electrical connections being required at each end.

Therefore, it is an object of this invention to provide a new and improved line following apparatus.

It is another object of this invention to provide a line following apparatus which employs an arrangement for optically detecting the position of a line being followed.

It is an additional object of this invention to provide a line following apparatus which is capable of tracing a line laid down by a pen and ink recorder without the necessity of specially treating the graph in order to further delineate the line.

It is a further object of this invention to provide a simplified line detecting head employing a single photocell in a line following apparatus.

Briefly, the invention employs as a line position detector a curve following head having a lamp that illuminates a narrow portion of the graph, a photocell for detecting the position of the line and providing a signal in accordance therewith, and a pair of mirrors, one of which is integral with a focusing lens and is also rotatable in position. The rotatable mirror, in accordance with an aspect of the invention, is oscillated at a synchronized rate by a varying magnetic field which is produced by the combination of a permanent magnet and an electromagnetic coil energized by a reference alternating voltage. The photodetector generates an electrical signal which may vary in amplitude and phase polarity relative to the reference voltage and which by its phase polarity indicates the position of the head with respect to the line. In accordance with the invention, the output signal from the photodetector is amplified and fed to one winding of a two-phase servomotor which controls the position of the line following head. The other winding of the servomotor is energized by the same reference alternating voltage which energizes the oscillating coil for the mirror.

Thus, the direction of rotation of the servomotor will depend upon the relative positions of the scanned line segment and the curve following head, and its linkage to the curve following head is suitably arranged to center the head over the line being scanned. To provide the desired voltage output signal which is indicative of the position of the particular line segment being scanned with respect to some reference position, an arrangement is provided to develop an output voltage in accordance with the shaft rotation of the servomotor.

The phase reversible component of the photocell output signal is of the same frequency as the base frequency of the reference voltage when the line following head is not centered over a scanned line segment. However, when the head is precisely centered over the line, the output of the photocell consists principally of a frequency component which is twice the base frequency. An associated photocell signal amplifier may include a network for eliminating higher frequency components of the signal above the base frequency and a filter specifically designed to block that component having a frequency which is twice the base frequency. Furthermore, in order to minimize undesirable interference from other sources of twice base frequency signal components, the lamp which is incorporated in the head for illuminating a portion of the line being scanned is energized by a direct current supply which is filtered and regulated in order to prevent cyclic variations in the illumination emanating from the lamp.

The invention may be better understood from a consideration of the following detailed description taken in conjunction with the drawings, in which:

FIG. 1 is a perspective view from the underside of a curve following head in accordance with the invention;

FIG. 2 is a side view of the curve following head of FIG. 1;

FIG. 3 is an end view of the curve following head of FIG. 1;

FIG. 4 is a perspective view of the curve following head of FIG. 1 with a portion of the lower cover cut away in order to show the arrangement of parts therein;

FIG. 5 is a perspective view of a particular portion of the head of FIG. 1 illustrating a mechanism for positioning the photocell;

FIG. 6 is a perspective view of a portion of the head of FIG. 1 illustrating an arrangement for cyclically rotating the movable mirror of the head;

Figure 10:
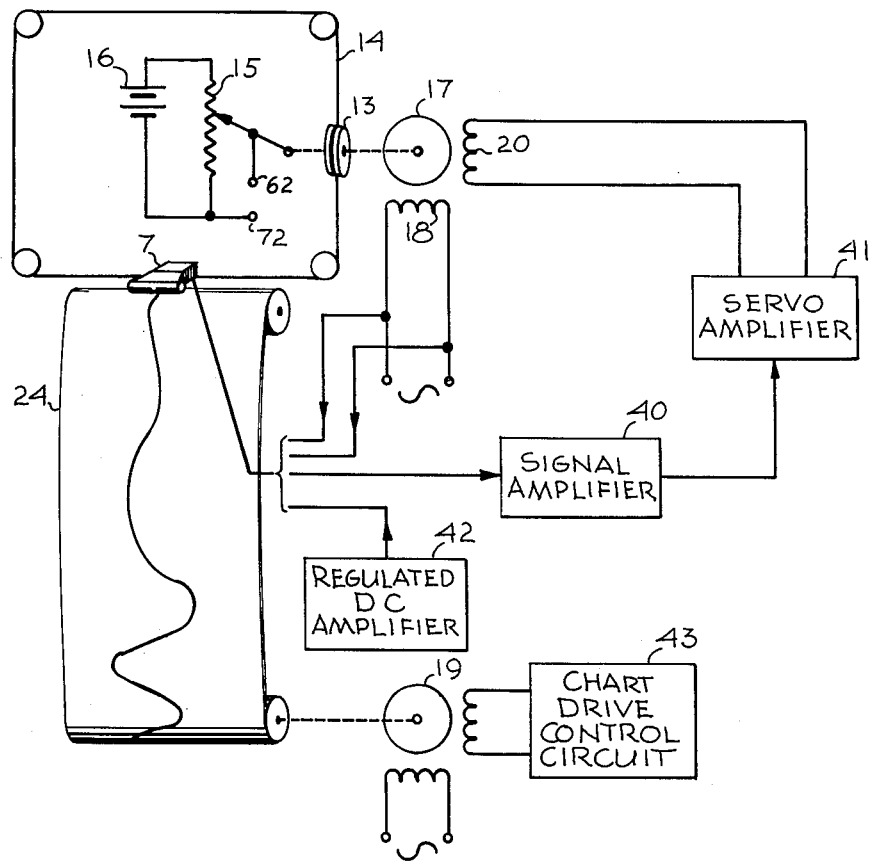

FIGS. 7(a) and 7(b) depict diagrammatically the arrangement for directing the beam from the light source to the photocell in the head of FIG. 1;

FIG. 8 is a set of graphical illustrations depicting the phase relationships of signals generated in a curve following system in accordance with the invention;

FIG. 9 is a schematic representation of an electrical circuit to which the photocell of the curve following head of FIG. 1 may be connected; and FIG. 10 is a block diagram of a complete curve following system in accordance with the invention.

In FIGS. 1 through 3, which represent different views of a curve following head 7 in accordance with the invention, a portion of the head 7 defines an aperture 8 through which a lamp 9 emits light for illuminating an associated graph. Light reflected from the graph is directed to a mirror 2 through an opening in a lower cover 3, with a shield 4 being provided to shut out extraneous illumination. An adjustment aperture 5 is provided in a side of the head 7 to permit the proper positioning of the photocell within.

The arrangement for adjusting the position of the photocell is shown in detail in FIG. 5 in which a photocell tube 6 receives light passing through an aperture 38. An adjustment opening 5 permits the insertion of a splined tool 10 to engage the teeth of a toothed rack 26 by means of which the position of the photocell 6 may be adjusted within the head.

FIG. 4 illustrates the arrangement of the interior components of the head 7. The photocell 6 is positioned to receive an image reflected from a rotatable mirror 1 which is mounted on a shaft extending through a bearing 62 in the head 7. The rotatable mirror 1 has attached to its face a lens 11 for providing the desired focusing. The mirror 1 receives an image reflected by the fixed mirror 2 and sweeps this image across the face of the photocell 6.

A better understanding of the path of the reflected beam may be gained by referring to FIGS. 7(a) and 7(b) which depict in side and bottom views the path of the light as it passes from the lamp 9 to graph paper 24, thence to the mirror 2, through the lens 11 to the rotatable mirror 1 and back through the lens 11 to the photocell 6. As the mirror 1 rotates, it directs succeeding particular portions of the image reflected from the mirror 2 to the photocell 6. Thus only a portion of the field of view available from the mirror 2 is directed to the photocell 6 at any given instant.

FIG. 6 illustrates an arrangement in accordance with the invention for cyclically rotating the mirror 1 in synchronism with an applied alternating signal. In FIG. 6 the housing on the upper side of the head 7 is shown cut away to illustrate a permanent magnet 12 between the ends of which is positioned a rotatable pole piece 28. The pole piece 28 is attached to the mirror 1 (FIG. 4) by means of a screw 29 set in the mirror shaft (not shown). Beneath the pole piece 28 is a coil 30 which may be energized by an alternating signal. When the coil 30 is so energized it produces a varying magnetic field which reacts with the field of the permanent magnet 12 to establish a varying field at the pole piece 28 and cause the pole piece 28 to rotate about a vertical axis. Thus the pole piece 28 rotates the mirror 1 in accordance with the alternating signal applied to the coil 30.

In the practice of the invention, various signals of different amplitudes and phase polarities will be generated in accordance with the relative positions of the curve following head 7 and the segment of the curve being viewed at any given time. These signals are compared in phase with respect to a reference signal and the phase polarity is detected as a correction signal to center the curve following head 7 over the viewed curve.

In one specific embodiment of the invention, the photocell 6 is connected in an electrical amplifying circuit 40 which is represented schematically in FIG. 9. There the photocell resistance 46 is shown as part of a voltage divider network which is connected to the control grid of a vacuum tube 48 via a resistor 47. From the plate of the vacuum tube 48 the amplified signal is directed to the control grid of a vacuum tube 51 via a capacitor 49 and a resistor 50. The signal at the plate of the tube 51 is then directed to an output terminal 53 via a capacitor 52.

In shunt connection to the signal path just described at the control grid of the tube 51, there is a parallel network 61 comprising an inductance 54 and a capacitor 55. The network 61 is resonant at a frequency of 60 cycles per second which is the frequency of the reference signal employed in the illustrative embodiments of the invention. Thus, when pulsed at a 60-cycle rate, the network 61 generates substantially sine wave signals for application to the control grid of the tube 51. On the other hand, the series rejection filter network 60 comprising an inductance 56 and capacitors 57 and 58 between the plate of the tube 51 and the output terminal 53 is arranged, in accordance with another aspect of the invention, to block signals of a frequency which is twice that of the reference frequency or, in the case of this particular embodiment, 120 cycles per second.

In operation, the photocell resistance 46 decreases in value as the intensity of light incident thereon increases. Conversely, as the incident light decreases and passes through a minimum, as it does when the photocell scans a darkened line segment, the photocell resistance 46 passes through a maximum value. When the photocell resistance 46 is a maximum the potential of the control grid of the tube 48 is a minimum. Thus, an electrical pulse is developed at the control grid each time the photocell scans across a line segment. These pulses, amplified and inverted through the amplifier circuit of the tube 48, are shown in curves *b*, *d* and *f* of FIG. 8 as they appear at the plate of the tube 48 for different positions of the curve following head 7 of FIG. 1 relative to the graph line being scanned. As already mentioned, the pulses from the plate of the tube 48 drive the resonant circuit 61 to produce sine waves at the control grid of a tube 51. Waveforms *c*, *g* and *e* of FIG. 8 depict the signals appearing across the resonant circuit 61 in response to the waveforms *b*, *d* and *f* respectively at the plate of the tube 48.

Waveform *a* of FIG. 8 represents the signal employed in the invention to energize the electrical coil 30 (FIG. 6). The mirror 1 is driven in synchronism with this signal which may be considered the 60-cycle reference signal of the invention. Waveform *b* depicts a series of pulses which result when the curve following head 7 is precisely centered over the line of the graph being traced. It can be seen that one pulse is provided for each sweep of the beam across the photocell aperture. Since the mirror 1 sweeps back and forth twice each cycle, the pulses of the waveform *b* occur at a 120-cycle rate which is twice the frequency of the reference waveform *a*. The waveform *c* which is present at the control grid of the tube 51 when the pulses of the waveform *b* are produced, therefore, is a sine wave of 120-cycle frequency which is blocked by the rejection filter network 60 so that essentially no output is produced at the terminal 53 when the curve following head 7 is centered over the line of the graph.

The waveform *d* represents the pulses which are produced by the photocell resistance 46 at the plate of the tube 48 when the curve following head 7 is displaced near the viewing limit on one side of the graph line being traced. As the mirror 1 sweeps the reflected beam across the photocell aperture, a pair of pulses very close together are produced as a result of the graph line being near one end of the trace. Since the pair of pulses appears once each cycle of the reference frequency, a sine wave such as the waveform *e* of the same frequency (60 cycles per second) results at the control grid of the tube 51. However, it can be seen from FIG. 8 that this waveform is displaced in phase from the reference waveform *a*. Similarly, if the curve following head 7 drifts to the other side of the graph line being traced, a series of pulses such as appear in the waveform *f* are produced and in turn generate a 60-cycle sine wave *g* having a phase which is shifted in the opposite direction with respect to the waveform *a* from that of the waveform *e*. The 60-cycle signals of waveforms *e* or *g* pass unimpeded through the network 60 to the output terminal 53. From the terminal 53 these signals, which by their respective phase displacements from the reference waveform *a* indicate the deviation of the head 7 from the graph line, are further amplified and employed to center the curve following head 7 over the graph line which it is tracing, as will now be described with reference to the arrangement of FIG. 10.

In order to cause the curve follower of the invention to trace the length of the curve a mechanism may be provided for producing relative movement between a record medium and the curve following head. FIG. 10 illustrates one such arrangement in which a record 24 is transported past a curve following head 7 which is adapted to move along a traverse perpendicular to the direction of movement of the record 24. It will be appreciated that alternative arrangements may be used as well, as for example the mechanism commonly found in flat-bed recorders in which the record is held in fixed position with a pen being mounted on a carriage above the bed so that the pen is positionable in two orthogonal directions. By replacing the pen with the curve following head 7, the arrangement may be adapted to operate in accordance with the present invention. FIG. 10 is a simplified illustration of the type of recorder sometimes referred to as "strip chart" recorder in which a motor 19 is linked to a chart drive mechanism for transporting the record 24 at a desired velocity. In order to control selectively the speed of transport of the record 24, there may be connected to the motor 19 a chart drive control circuit 43. The curve following head 7 is linked to a servomotor 17 by a suitable linkage which may include a cable 14, a cable drive sheave 13 with one winding 18 of the servomotor being connected to a suitable alternating current supply source while the other winding 20 is connected to receive an alternating current of variable amplitude and reversible phase from the servo-amplifier 41 as described in detail below. A motor 17 functions to position a moving contact on a potentiometer 15 which is connected across a voltage source 16. Since the position of the contact of the potentiometer 15 corresponds to the curve on the record 24, a voltage may be derived from the terminals 62 and 72 corresponding to the value represented by the curve.

In order to prevent the lamp 9 (FIG. 1) of the head 7 from introducing spurious fluctuations at a 120-cycle rate, a regulated direct current source 42 of essentially constant voltage is provided to energize the lamp 9. Thus, the illumination of the graph is maintained substantially constant so that variations of output from the photocell 6 will be true signal indications related to the graph only.

A signal indicative of the relative position of the head 7 with respect to the curve on the record 24 is applied in the arrangement of FIG. 10 to a signal amplifier 40 which may be constructed in accordance with the schematic circuit diagram of FIG. 9. By connecting the coil 30 (FIG. 6) of the curve following head 7 across the source of alternating current applied to the motor winding 18 as shown in FIG. 10, the output from the signal amplifier 40 bears a phase relationship corresponding to the position of the head 7 with respect to the curve. Accordingly the output from the signal amplifier 40 may be amplified by the servo-amplifier 41 and applied to the winding 20 to control the rotation of the motor 17 so that a closed loop servo-system is provided in which the curve following head 7 is positioned above the curve and an output signal is derived from the terminals 62 and 72 corresponding to the value represented by the curve.

Thus, in accordance with the invention, an arrangement is advantageously provided for automatically generating a signal voltage which is representative of the function plotted on a graph. When the record 24 is moved past the curve following head 7 at a linear rate, as is customarily the case, the output voltage is representative of a function varying with time. Clearly, however, the output waveform can be related to any other variable simply by relating the setting of the chart drive control circuit 43 to the desired variable.

Although specific arrangements of an automatic curve following apparatus in accordance with the invention have been described for the purpose of illustrating the manner in which the invention may be utilized to advantage, it will be appreciated that the invention is not limited thereto. Accordingly, any and all modifications, variations or equivalent arrangements falling within the scope of the annexed claims should be considered to be a part of the invention.

What is claimed is:

1. Apparatus for producing an electrical signal in accordance with the position of a line segment relative to a reference point comprising a curve following head having a light source for directly illuminating a selected portion of a graph, a first mirror fixedly attached to said head for reflecting the image of the portion of the graph illuminated by the light source, a second mirror rotatably attached to the head for reflecting the image received from the first mirror, detecting means for generating an electrical signal in accordance with the intensity of light incident thereupon from the second mirror, and means for oscillating the second mirror transversely to the path of the image reflected from the first mirror; means for controlling the position of the curve following head in accordance with the signal received from the detecting means; and means for producing an electrical signal indicative of the position of the curve following head.

2. An arrangement for producing an electrical signal indicative of a variable function represented by a graphical curve comprising a curve following head, a source of illumination for said graphical curve, photoelectric means for generating an electrical signal in accordance with the intensity of light incident thereon, first and second mirrors attached to said head for directing the image of said graph to said photoelectric means, said second mirror being rotatable for controlling the portion of the graph image which is directed to said photoelectric means, means for oscillating said second mirror including a permanent magnet, a rotatable pole piece adjacent thereto and an electromagnetic coil for varying the magnetic field existing at said pole piece, a servomotor for moving said curve following head, means for applying an alternating signal of a reference phase to said servomotor and to said electromagnetic coil, means for applying the output signal from said photoelectric means to said servomotor, and means for generating an electrical signal indicative of the position of the curve following head.

3. In an arrangement for producing an electrical signal indicative of the position of a movable element tracing a graphical curve, a curve following head comprising a light source for illuminating a particular portion of the curve, a first mirror attached to the head for reflecting the image of the illuminated portion of the curve, a second mirror rotatably attached to the head for controlling the portion of the reflected image directed to a particular point, photoelectric means located at said point, and means for oscillating said second mirror comprising a permanent magnet attached to said head, a rotatable pole piece attached to said mirror and an electromagnetic coil energized with a predetermined signal in order to vary the magnetic field existing at said rotatable pole piece.

4. In an arrangement for producing an electrical signal indicative of the position of a movable element tracing a graphical curve, a curve following head comprising a source of illumination for said graphical curve, a first mirror fixedly attached to said head for reflecting the image of the illuminated graphical curve, photoelectric means, a second mirror rotatably attached to said head for reflecting an image of said graphical curve to said photoelectric means, a lens attached to said second mirror for focusing the image reflected therefrom, and means for cyclically rotating said mirror comprising a permanent magnet attached to the head, a movable pole piece of a magnetic material attached to the second mirror and an electromagnetic coil for varying the field existing at the pole piece at a predetermined frequency.

5. In an arrangement for producing an electrical signal varying in accordance with the position of succeeding segments of a graphical curve being traced, a curve following head having a light source for illuminating a segment of the curve, means for energizing said light source to produce an unvarying illumination therefrom, a single photocell attached to the head, reflecting means for directing the image of the illuminated line segment to the single photocell, said reflecting means including a first mirror fixedly attached to the head and a second mirror rotatably attached thereto, a lens integral with said second mirror for focusing the reflected image of the line segment, and means for cyclically rotating said second mirror comprising a permanent magnet attached to the head, a movable pole piece of a magnetically permeable material attached to the mirror, an electrical coil for varying the magnetic field existing at the pole piece, and means for energizing the electrical coil in accordance with a predetermined signal.

6. An arrangement for causing a movable element to follow a graphical curve comprising a curve following head having a constant intensity light source for illuminating a particular segment of the curve, a single photoelectric detector, a first mirror fixedly attached to the head for reflecting the image of the illuminated portion of the curve, a second mirror rotatably attached to the head for sweeping the image reflected from said first mirror across said photoelectric detector, and means for cyclically rotating said second mirror comprising a permanent magnet attached to the head, a movable pole piece of a magnetically permeable material attached to the second mirror and an electrical coil for varying the magnetic field applied to the movable pole piece, a motor having a pair of windings for controlling the position of the curve following head, means for applying an alternating signal of a reference frequency to the first winding of said motor and to said electrical coil, and a signal amplifier connected between the single photodetector and the second winding of the motor including a signal path, a first parallel network tuned to said reference frequency in shunt with the signal path and a second filter network tuned to a frequency which is twice the reference frequency in series with the signal path.

7. A curve following head for tracing the path of a line on paper comprising a light source for illuminating a selected portion of the line, a first mirror fixedly mounted on said head for receiving an image from the paper, a second mirror rotatably mounted on said head for receiving the image reflected from the first mirror and directing it over a particular time interval to succeeding points in a predetermined arc, photodetecting means located at a particular point in said arc, and means for cyclically rotating said second mirror in accordance with said particular time interval comprising a permanent magnet attached to said head, a movable pole piece of a magnetically permeable material adjacent said magnet and attached to said mirror, and an electromagnetic coil for varying the magnetic field at said pole piece at a predetermined frequency.

8. In an arrangement for producing an electrical signal indicative of the position of a movable element tracing a graphical curve, a curve following head comprising a light source for illuminating a particular portion of the curve, a first mirror fixedly attached to the head for reflecting the image of the illuminated portion of the curve, a second mirror rotatably attached to the head for controlling the portion of the reflected image from the first mirror directed along a particular radial path from the second mirror, photoelectric means located along said radial path, means for adjusting the position of said photoelectric means along said radial path, and means for cyclically rotating the second mirror at a predetermined frequency comprising a permanent magnet and a pole piece movable relative to each other and connected between the second mirror and the head, an electromagnetic coil adjacent said magnet and said pole piece, and means for energizing said electromagnetic coil with an electrical signal of said predetermined frequency in order to vary the magnetic field in the vicinity of the pole piece.

9. A curve following head in accordance with claim 8 wherein said adjusting means comprises a toothed rack attached to said photoelectric means and a removable splined pinion for engaging said rack and said curve following head in order to move the photoelectric means relative to the head along said particular radial path.

10. In an arrangement for producing an electrical signal indicative of the position of a movable element tracing a graphical curve, a curve following head comprising a light source for illuminating a particular portion of the curve, a first mirror fixedly attached to the head for reflecting the image of the illuminated portion of the curve, a second mirror rotatably attached to the head for controlling the portion of the reflected image from the first mirror directed along a particular radial path from the second mirror, photoelectric means located along said radial path, and means for cyclically rotating the second mirror at a predetermined frequency comprising a permanent magnet and a pole piece movable relative to each other and connected between the second mirror and the head, an electromagnetic coil adjacent said magnet and said pole piece, and means for energizing said electromagnetic coil with an electrical signal of said predetermined frequency in order to vary the magnetic field in the vicinity of the pole piece.

11. Apparatus for producing an electrical signal in accordance with the position of a line segment relative to a reference point in order to control a motor driving a line following apparatus comprising a curve following head having a light source for directly illuminating a selected portion of a graph, a first mirror fixedly attached to said head for reflecting the image of the portion of the graph illuminated by the light source, a second mirror rotatably attached to the head for reflecting the image received from the first mirror, detecting means for generating an electrical signal in accordance with the intensity of light incident thereon from the second mirror, and means for oscillating the second mirror transversely to the path of the image reflected from the first mirror at a preselected frequency.

12. For use in an arrangement for producing an electrical signal indicative of a variable function represented by a graphical curve, a mechanism comprising a curve following head, a source of illumination for said graphical curve, photoelectric means for generating an electrical signal in accordance with the intensity of light incident thereon, first and second mirrors attached to said head for directing the image of said graph to said photoelectric means, said second mirror being rotatable for controlling the portion of the graph image which is directed to said photoelectric means, and means for oscillating said second mirror including a permanent magnet, a rotatable pole piece adjacent thereto, and an electromagnetic coil for varying the magnetic field existing at said pole piece.

13. An arrangement for generating an electrical signal indicative of the relative deviation of a curve following head from the scanned portion of a graphical curve comprising a curve following head having a constant intensity light source for illuminating a particular segment of the curve; a single photoelectric detector; a first mirror fixedly attached to the head for reflecting the image of the illuminated portion of the curve; a second mirror rotatably attached to the head for sweeping the image reflected from said first mirror across said photoelectric detector; means for cyclically rotating said second mirror comprising a permanent magnet attached to the head, a movable pole piece of a magnetically permeable material attached to the second mirror, and an electrical coil for varying the magnetic field applied to the movable pole piece; a signal amplifier connected to receive output signals from the photoelectric detector along a signal path; a first parallel network tuned to a particular reference frequency in shunt with the signal path; and a second filter network tuned to a frequency which is twice said reference frequency in series with the signal path.

References Cited in the file of this patent

UNITED STATES PATENTS

| | | |
|---|---|---|
| 2,261,644 | Cockrell | Nov. 4, 1941 |
| 2,640,938 | Neergard | June 2, 1953 |
| 2,744,224 | Bode | May 1, 1956 |
| 2,817,021 | Williams et al. | Dec. 17, 1957 |